US011054004B2

(12) United States Patent
Hogan et al.

(10) Patent No.: US 11,054,004 B2
(45) Date of Patent: Jul. 6, 2021

(54) ROLLER CHAIN OUTER PLATE LINKS: ARRANGEMENTS, SYSTEMS OF USE, AND METHODS

(71) Applicant: FMH Conveyors LLC, Jonesboro, AR (US)

(72) Inventors: William Mark Hogan, Virginia Beach, VA (US); Jamshid Naderi, Henrico, VA (US)

(73) Assignee: FMH Conveyors LLC, Jonesboro, AR (US)

( * ) Notice: Subject to any disclaimer, the term of this patent is extended or adjusted under 35 U.S.C. 154(b) by 0 days.

(21) Appl. No.: 16/704,146

(22) Filed: Dec. 5, 2019

(65) Prior Publication Data

US 2020/0109770 A1    Apr. 9, 2020

Related U.S. Application Data

(63) Continuation of application No. 15/401,613, filed on Jan. 9, 2017, now Pat. No. 10,533,646.

(51) Int. Cl.
| | | |
|---|---|---|
| *F16H 19/06* | (2006.01) | |
| *B21L 9/04* | (2006.01) | |
| *F16G 13/18* | (2006.01) | |
| *F16G 13/06* | (2006.01) | |
| *F16G 13/16* | (2006.01) | |
| *B65G 21/14* | (2006.01) | |

(52) U.S. Cl.
CPC ........... *F16H 19/0663* (2013.01); *B21L 9/04* (2013.01); *F16G 13/06* (2013.01); *F16G 13/16* (2013.01); *F16G 13/18* (2013.01); *B65G 21/14* (2013.01)

(58) Field of Classification Search
CPC ..... B65G 21/14; B65G 15/26; F16H 19/0663; F16G 13/06; F16G 13/16; F16G 13/18; H02G 11/006; B21L 9/04
USPC ................................ 198/588, 594, 812, 850
See application file for complete search history.

(56) References Cited

U.S. PATENT DOCUMENTS

| | | |
|---|---|---|
| 2,432,411 A | 12/1947 | Guerin et al. |
| 2,452,242 A | 10/1948 | Johnson |
| 2,620,676 A | 12/1952 | Raddings |
| 2,972,857 A | 2/1961 | Bodman |
| 3,231,069 A | 1/1966 | Lanham |

(Continued)

FOREIGN PATENT DOCUMENTS

GB          445527 A        4/1936

OTHER PUBLICATIONS

Tsubaki, Small Size Conveyor Chains & Sprockets, Tsubakimoto Chain Co., Catalog No. ME 1311, (c) 2014, 168pgs.

(Continued)

*Primary Examiner* — James R Bidwell
(74) *Attorney, Agent, or Firm* — Michael Best and Friedrich LLP

(57) ABSTRACT

Roller chain outer plate links including a cable support portion are disclosed. Example roller chain outer plate links include a link portion, a cable support portion oriented projecting from an outer face of the link portion, and a joint at one of the lead/tail ends of the link portion. The link portion, joint, and cable support portions each comprise portions integral with remaining portions of the outer plate link. Cable support portions of the roller chain outer plate links support a cable extending between components of an apparatus.

19 Claims, 14 Drawing Sheets

(56) References Cited

U.S. PATENT DOCUMENTS

| | | |
|---|---|---|
| D289,497 S | 4/1987 | Schroeder et al. |
| 5,193,660 A | 3/1993 | McKernan et al. |
| 5,203,745 A | 4/1993 | Wang |
| 7,240,477 B1 | 7/2007 | Dunfee et al. |
| D734,590 S | 7/2015 | Evers |
| 10,533,646 B2 * | 1/2020 | Hogan ................ B21L 9/04 |
| 2002/0165057 A1 | 11/2002 | Barton et al. |
| 2006/0194664 A1 | 8/2006 | Wang |
| 2016/0040753 A1 | 2/2016 | Wang |

OTHER PUBLICATIONS

U.S. Appl. No. 29/590,255, filed Jan. 9, 2017, 34pgs.
European Patent Office Examination Report for Application No. 18150893.8 dated Dec. 8, 2020 (7 pages).
European Search Report dated Jul. 20, 2018 for corresponding European Application No. 18150893.8 (9 pages).

* cited by examiner

ROLLER CHAIN OUTER PLATE LINKS: ARRANGEMENTS, SYSTEMS OF USE, AND METHODS

FIELD OF THE DISCLOSURE

The present disclosure relates to arrangements and features of roller chain outer plate links. The outer plate link is configured to support a cable passing between components of an apparatus. The present disclosure also relates to methods of manufacturing a roller chain outer plate link. Additionally, the present disclosure relates to telescopic equipment systems including roller chains.

INTRODUCTION

Roller chain outer plate links are components of roller chains. Roller chains are flexible chains configured to engage a sprocket. The roller chain can drive the sprocket or the sprocket can drive the roller chain.

An example roller chain 10 known in the art is shown in FIG. Roller chain 10 is a series of pivotally connected components. Roller chain 10 is flexible in a direction about the axes of pins 18 holding the components together and minimally flexible in the direction normal to the axes of pins 18 holding the components together.

Outer edges OE of roller chain 10 are defined by outer plate links 12. Outer plate links 12 are adjacent inner plate links 14 in an offset alignment. Except in some instances, such as at the ends of roller chain 10, the offset alignment is arranged such that each outer plate link 12 is in contact with two distinct inner plate links 14.

Inner plate links 14 and outer plate links 12 in example roller chain 10 each have a similar shape: lead/tail ends 20 with a waist 22. Because roller chain 10 moves in two, opposite directions each lead/tail end 20 is a lead or a tail end depending upon a given direction of roller chain 10 movement. As shown, lead/tail ends 20 are rounded and waist 22 is narrowed relative to the lead/tail ends 20.

Bushings 16 are disposed between the inner plate links 14 and can support rollers, not shown in FIG. 1. Pins 18 pass through each of the outer plate links 12, inner plate links 14, and bushings 16, holding the components together and enabling a pivotal range of flexibility for the roller chain.

In various implementations, roller chains can be arranged as a continuous loop or secured on both ends. Extendable equipment systems include moveable arrangements. When secured on both ends, roller chains can be used to extend or retract the moveable arrangement. In those applications, the moveable arrangement can be adjustably positioned through the interaction of drive motors, sprockets and roller chains, pulleys, and the like. An example of an extendable equipment system is an extensible conveyor.

Extensible conveyors usually include a fixed base section and at least one extensible section that telescopes relative to the base section. A conveyor belt runs a length of a top surface and typically is operable at various speeds.

Extensible conveyors also can include a cable that extends between two of the sections. The cable includes components for various purposes, for example, conduits for electronic communications. When cable passes between sections, the cable is managed so that it does not interfere with any moving parts.

Existing extensible systems, such as extensible conveyors, include various mechanisms for handling the cable. Some extensible conveyors use a pulley system to manage cable extending between telescopic sections. However, in pulley systems, if there is no tension on the cable, the cable sags under its own weight and can be caught between moving parts. Other extensible conveyors use a hose reel system, which can be exceedingly expensive.

Another extensible conveyor was designed such that the roller chain included washers welded to centers of selected outer links at locations between two mounting apertures. This conveyor is described in U.S. Pat. No. 5,193,660, "Extensible Conveyors," the entirety of which is hereby incorporated by reference. Improvements are provided herein.

SUMMARY

Techniques and apparatus disclosed herein relate to roller chain outer plate links and features of the outer plate links used to support a cable passing between sections of an apparatus.

In general, roller chain outer plate links include a link portion, a cable support portion, and a joint. In one instance, the link portion has opposite first and second lead/tail ends and an outer face. The link portion also defines a roller chain mounting aperture arrangement. The cable support portion is oriented projecting from the outer face. The joint is positioned at one of the lead/tail ends of the link portion. Also, the link portion, joint, and cable support portions each comprise portions integral with remaining portions of the outer plate link.

In another aspect, a method of manufacturing a roller chain outer plate link is disclosed. The method includes receiving a roller chain die, punching a material through the roller chain die to produce a flat outer plate link, and bending the flat outer plate link at the joint. The roller chain die includes an outer plate link die, the die defining: a link portion having a first end and second end, the link portion defining a mounting arrangement, a cable support portion, and a joint positioned at the second end of the link portion, the cable support portion integral to the link portion at the joint.

In another aspect, a telescopic equipment system includes a base stage, one or more extensible stages supported by the base stage, a roller chain and a cable disposed within the telescopic equipment system, and a sprocket assembly, where the roller chain is in operable engagement with the sprocket assembly. The roller chain includes an outer plate link including: a link portion having a first end and second end, the link portion defining a mounting arrangement, a cable support portion including a cable support aperture continuously surrounded by a frame, and a joint positioned at the second end of the link portion, the cable support portion integral to the link portion at the joint.

The details of one or more embodiments are set forth in the accompanying drawings and the description below. Other features, objects, and advantages of these embodiments will be apparent from the description, drawings, and claims. Moreover, it is to be understood that both the foregoing summary of the disclosure and the following detailed description are exemplary and intended to provide further explanation without limiting the scope of the disclosure.

BRIEF DESCRIPTION OF THE DRAWINGS

The following figures, which form a part of this application, are illustrative of described technology and are not meant to limit the scope of the claims in any manner.

DETAILED DESCRIPTION

Figure 1:
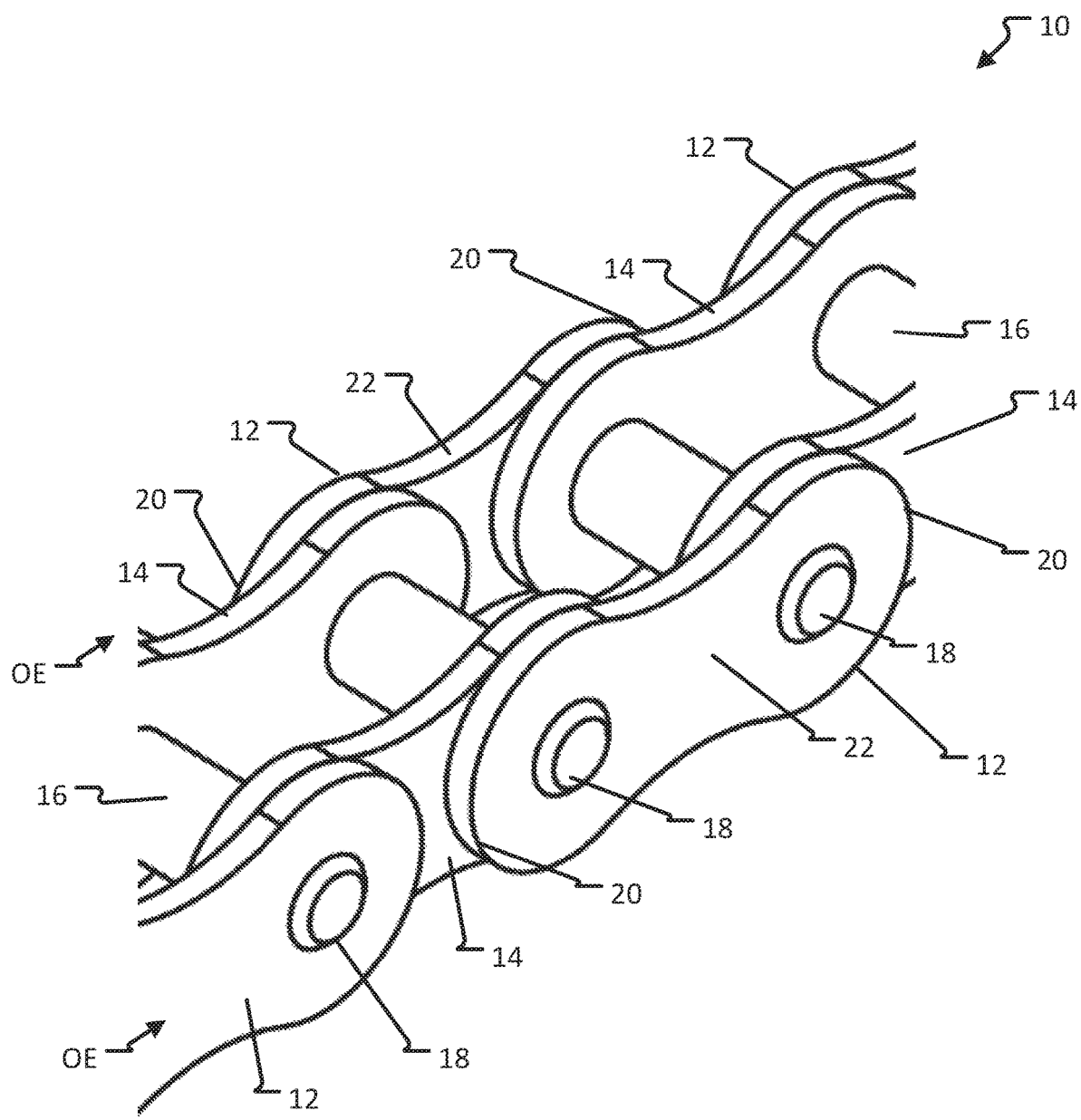
FIG. 1 is a perspective view of a prior art roller chain.

Various embodiments of the present invention will be described in detail with reference to the drawings, wherein like reference numerals represent like parts and assemblies throughout the several views. The features described herein are examples of implementations of certain inventive aspects which underlie the disclosure.

As briefly described above, embodiments of the present disclosure are directed to roller chain outer plate links designed to support a cable. The roller chain outer plate links are described below as used in example telescopic equipment systems, such as an example telescopic conveyor system.

Herein, the term "telescopic conveyor system" is used interchangeably with "extensible conveyor system". "Telescopic conveyor system" is meant to reference an apparatus including at least two stages, where at least one of the stages is extendable and configured to telescope inwards and outwards from a base stage. An example telescopic conveyor system 100 is shown in FIGS. 2-3, described concurrently below.

Figure 2:
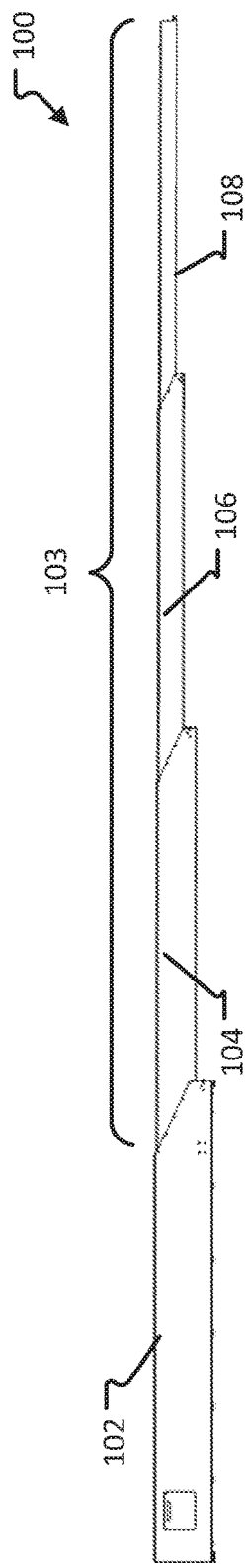
FIG. 2 is a schematic, side view of an example telescopic conveyor system.
Figure 3:
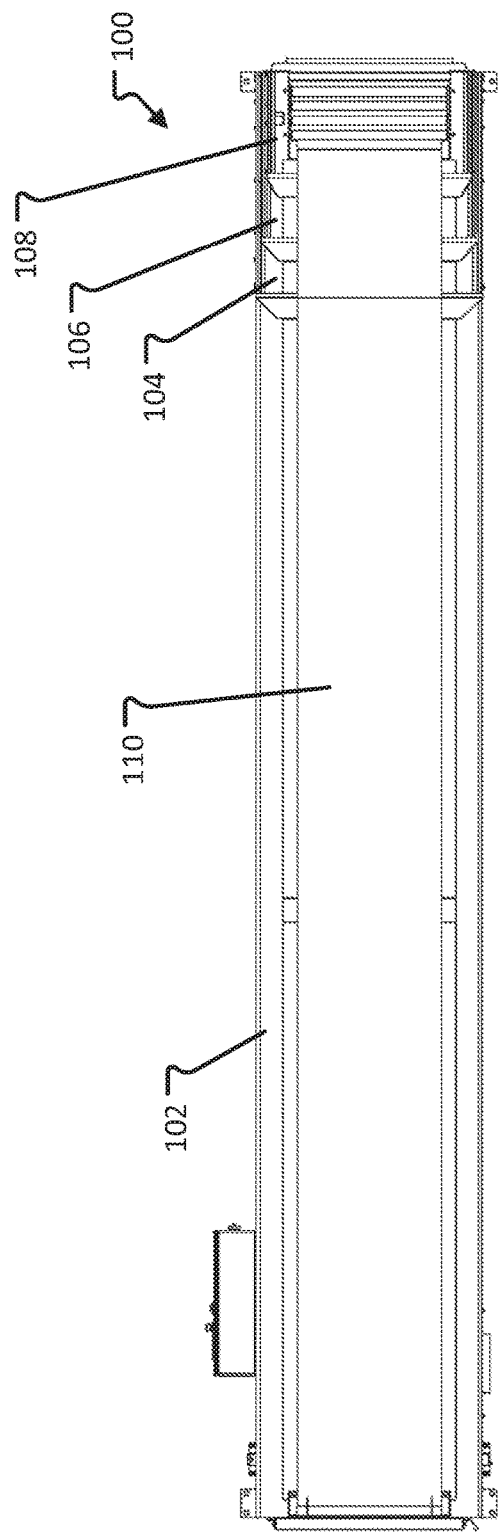
FIG. 3 is a schematic, top view of the telescopic conveyor system in FIG.

FIG. 2 is a schematic, side plan view of example telescopic conveyor system 100. Telescopic conveyor system 100 includes base stage 102 and extensible portion 103. Extensible portion 103 includes one or more stages and telescopes inward and outward from base stage 102. In the example shown in FIG. 2, extensible portion 103 includes three stages 104, 106, 108. In other embodiments, the extensible portion 103 includes more or fewer extensible stages.

Of course, telescopic conveyor system 100 includes other components, not shown, such as controls and motors. But for the roller chain disclosed herein, telescopic conveyor system 100 may be a telescopic equipment system of the type currently known or yet to be developed. A specific example of telescopic conveyor system 100 is the MaxxReach telescopic conveyor manufactured by FNIH Conveyors LLC (Suwanee, Ga.).

As shown in FIG. 2, telescopic conveyor system 100 is in an extended position. FIG. 3 is a schematic, top plan view of telescopic conveyor system 100 in a retracted position. Conveyor belt 110 runs along the top, and through the interior, of stages 102, 104, 106, 108.

Figure 4:
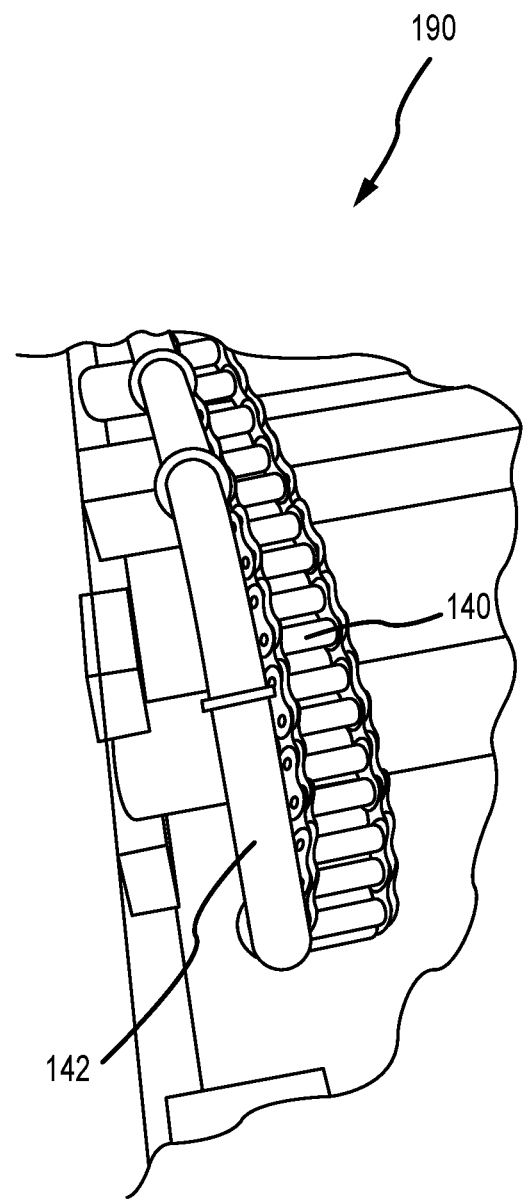
FIG. 4 is an interior view of a telescopic conveyor system.
Figure 5:
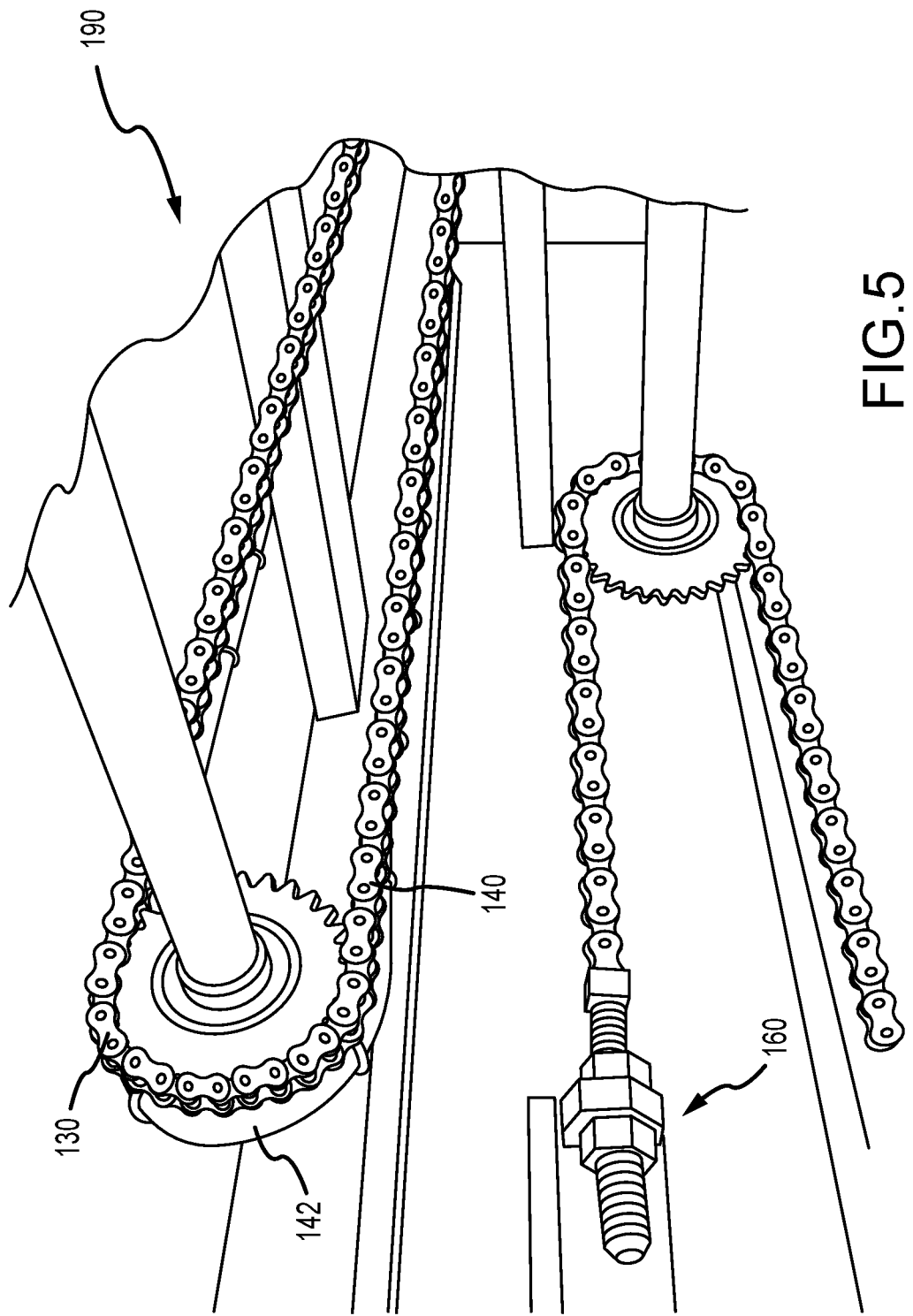
FIG. 5 is another interior view of a telescopic conveyor system.

FIGS. 4 and 5 show interior portions of a telescopic conveyor system 190. The interior of telescopic conveyor system 190 includes components that cooperate to adjust the relative positioning of extensible stages. These components include a control unit t shown) in communication with one or more drive motors (not shown).

Roller chain 140 is in operative engagement with sprocket assembly 130. The drive motors cause rotation of sprocket assembly 130 that, in turn, drives roller chain 140. Roller chain 140 is secured on each end with a securing arrangement 160. As roller chain 140 is driven by sprocket assembly 130, at least one of the extensible stages extend or retract.

In this example, cable 142 extends from a base stage through the extensible stages. Cable 142 is of a type known in the art and typically includes a plurality of conductive wires surrounded by insulation and a protective cover.

As cable 142 passes from base stage through the extensible stages, cable 142 is supported by roller chain 140 along an outer edge of the roller chain. Cable 142 can additionally be supported by junction boxes (not shown) and other conduits (not shown).

Figure 6:
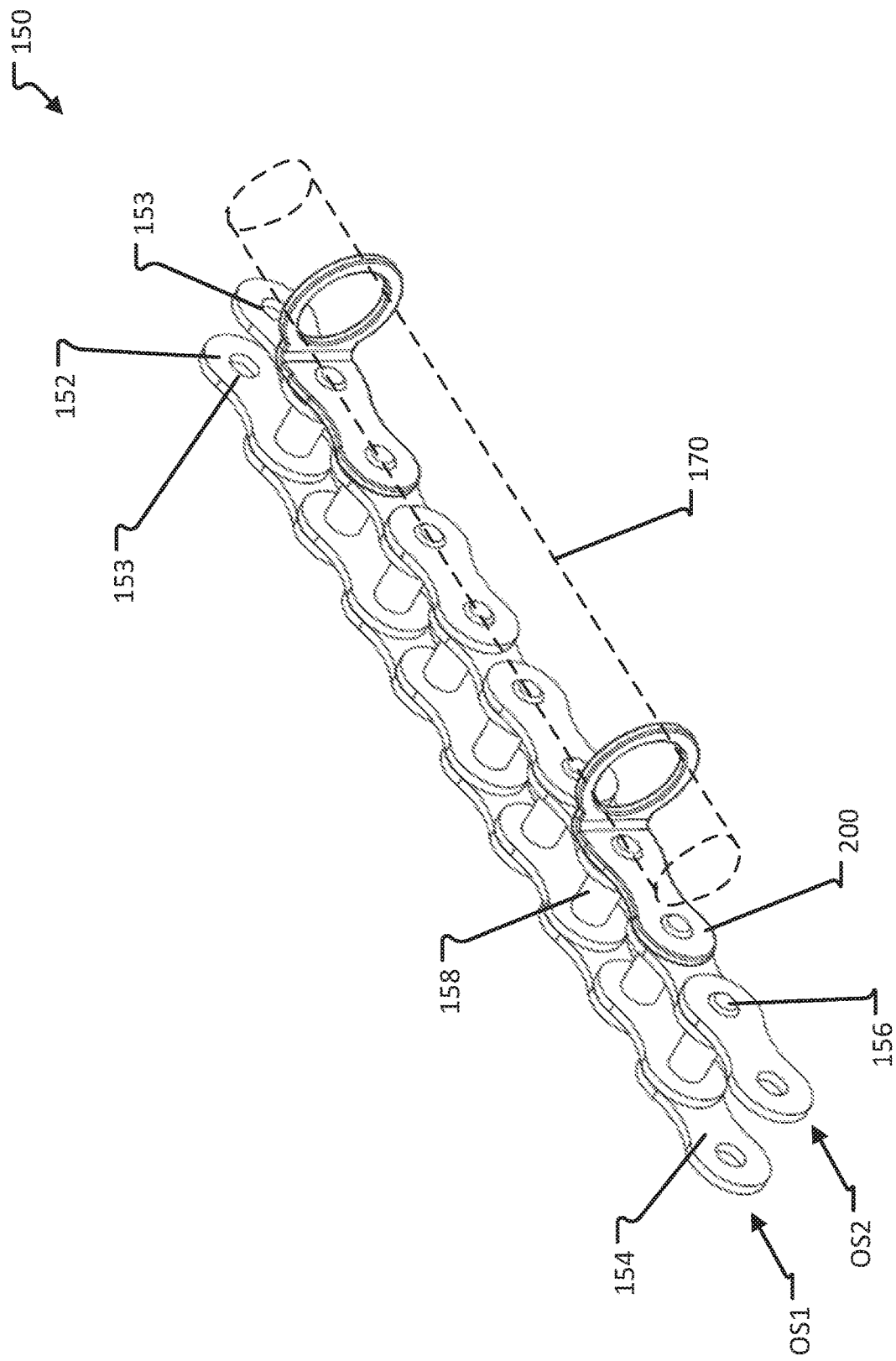
FIG. 6 is a schematic, perspective view of an example roller chain including a cable.
Figure 7:
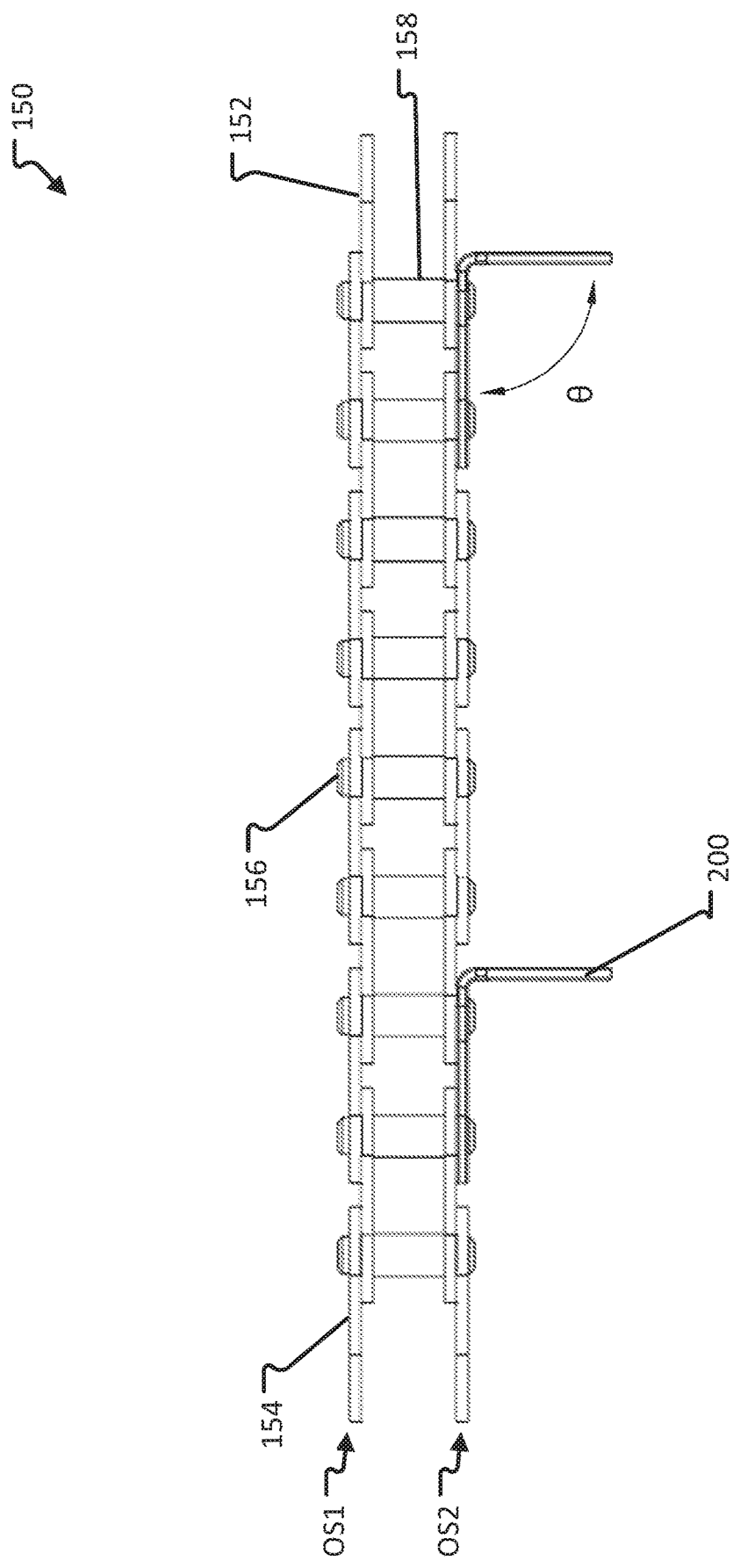
FIG. 7 is a schematic, top view of the roller chain shown in FIG. 6.

FIGS. 6-7 are schematic views of an example embodiment of a roller chain 150. The orientation of roller chain 150 in FIGS. 6-7 is a mirror image of the roller chain 142 shown in FIGS. 4-5, such that the outer edges in FIGS. 6-7 are in opposite positions from that shown in FIGS. 4-5. Roller chain 150 is arranged to operably engage with sprocket assembly 130.

Roller chain 150 includes inner plate link 152, outer plate link without cable support 154, outer plate link 200, pin 156, and bushing 158. Also shown in FIG. 6 is cable 170.

Roller chain 150 is arranged to have outer side OS1 and outer side OS2. Each outer side OS1, OS2 comprises a series of outer plate links without cable support 154 and/or outer plate links 200. Additionally, each outer side OS1, OS2 is adjacent a series of inner plate links 152. As shown, only one outer side, OS2, includes outer plate link 200. The opposite outer side, OS1, is comprised of only outer plate link without cable support 154.

Outer side OS2 includes a repeating arrangement of outer plate links without cable support 154 and outer plate links 200. As shown, two outer plate links without cable support 154 are in the series for each outer plate link 200. Other arrangements can include more or fewer outer plate links 200. For instance, outer side OS2 can include alternating outer plate links without cable support 154 and outer plate links 200. In another example, every fourth link in OS2 can be outer plate link 200. As the number of outer plate links without cable support 154 between outer plate links 200 increases, especially more than three outer plate links without cable support 154 for every outer plate link 200, cable sag between outer plate links 200 increases.

Inner plate links 152, in combination with pins 156, hold bushing 158 in place. Inner plate link 152 defines a mounting aperture arrangement 153. As shown, the mounting aperture arrangement 153 includes two separate, circular apertures, sized such that pin 156 passes therethrough.

Inner plate links 152 are similarly sized in height and length as outer plate links without cable support 154 in roller chain 150. Outer plate links without cable support 154 are similarly sized in height as outer plate links 200. Outer plate link 200 is described in more detail below.

Figure 8:
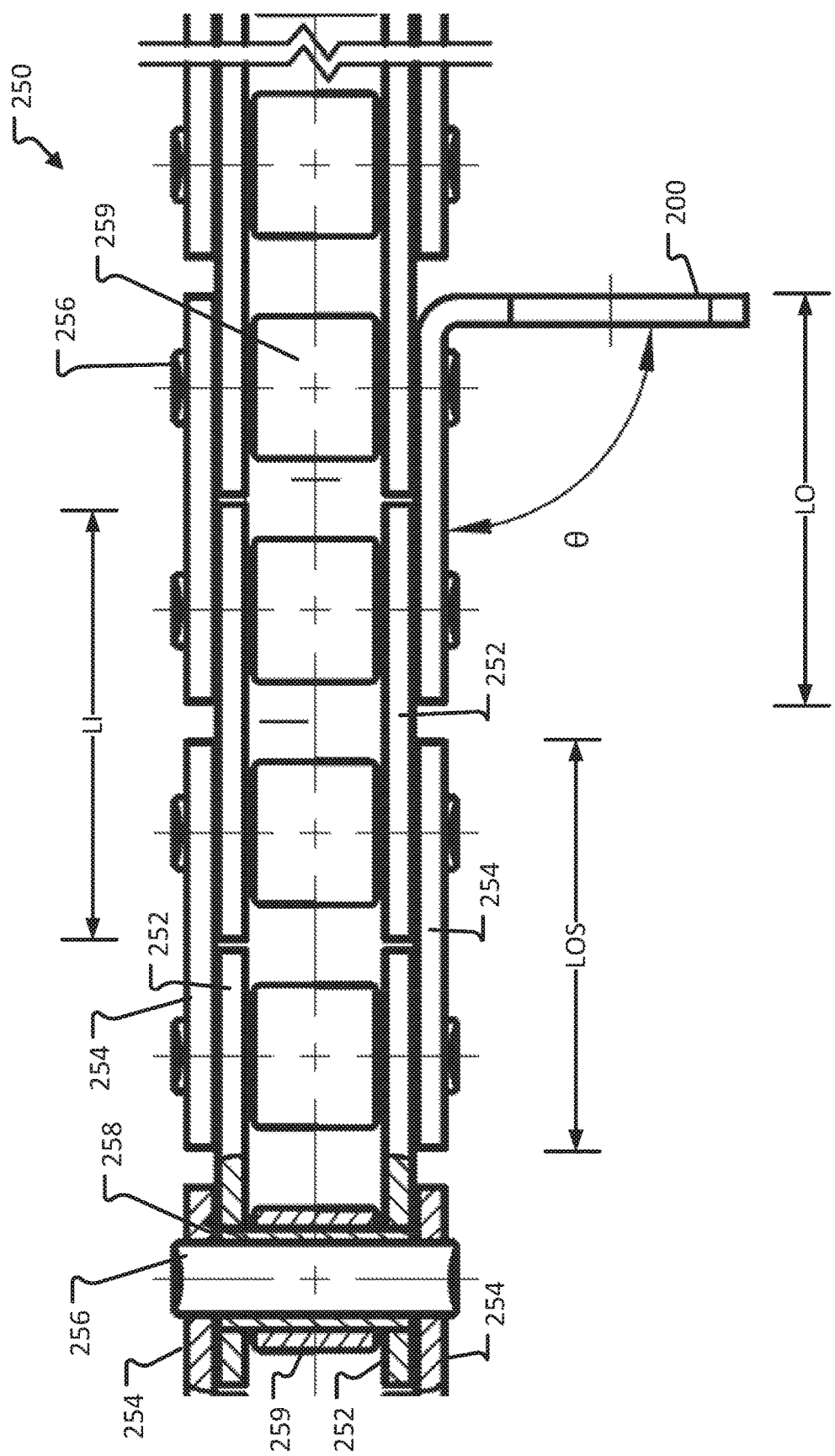
FIG. 8 is a schematic, top view of another example roller chain.
Figure 9:
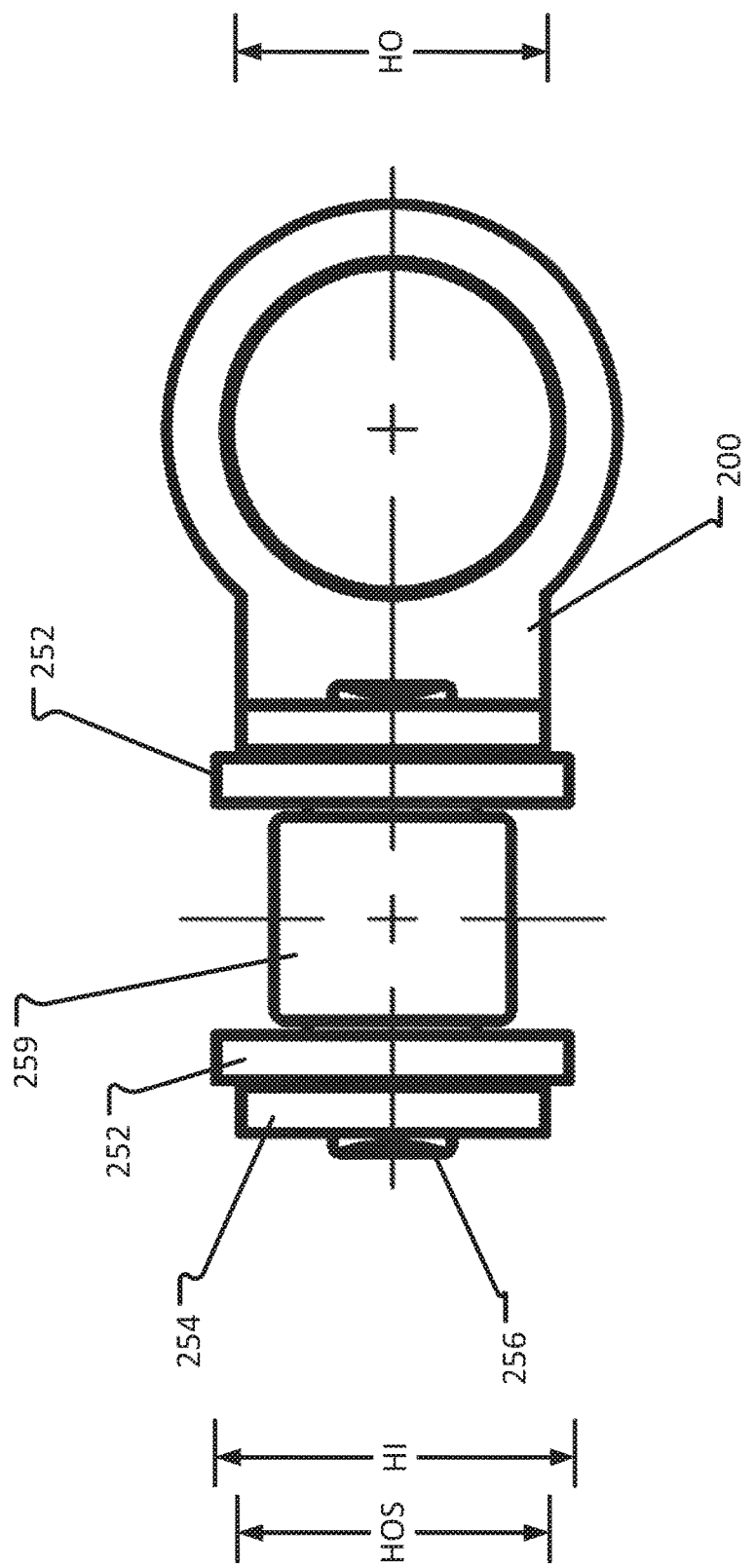
FIG. 9 is a schematic, front view of a portion of the roller chain shown in FIG.

FIGS. 8-9 show, schematically, another example embodiment of roller chain 250. FIG. 8 is a top view of a portion of roller chain 250. FIG. 9 is a front view of a portion of roller chain 250. Roller chain 250 can be used in telescopic conveyor system 100. Roller chain 250 includes inner plate link 252, outer plate link without a cable support 254, outer plate link 200, pin 256, bushing 258, and roller 259. Other embodiments can include more or fewer components.

FIG. 8 also includes, at one end, a partial sectional view. The partial sectional view shows that pin 256 passes through the outer plate links 254, inner plate links 252, and bushing 258. Bushing 258 only passes through inner plate links 252. Roller 259 is mounted on bushing 258 and disposed between inner plate links 252.

Roller chain 250 includes roller 259. In contrast, roller chain 150, depicted in FIGS. 5-7, does not include rollers. Roller 259 facilitates the engagement and disengagement of roller chain 250 and a sprocket assembly.

Another difference between roller chain 250 and roller chain 150 is the relative sizes of inner plate link 252 and each of outer plate link 200 and outer plate link without a cable support 254. A length L1 of inner plate link 252 is greater than a length LO of outer plate link 200. Length L1 is a distance between the outermost portions of the opposing lead/tail ends of inner plate link 252. Length LO is a distance between a lead/tail end 208 and the outer portion of the cable support 206. Length L1 of inner plate link 252 is also greater than a length LOS of outer plate link without a cable support 254. Length LOS is a distance between the outermost portions of the opposing lead/tail ends of outer plate link without a cable support 254. Lengths L1, LO, LOS, relative to each other, can vary in other embodiments.

A height HI of inner plate link 252 is greater than a height HOS of outer plate link without a cable support 254. The height HI of inner plate link 252 is greater than the height HO of link portion 206 of outer plate link 200. Each of heights HI, HOS, HO are a maximum distance between opposing length edges (the edges running between the lead/tail ends). Heights HI, HOS, HO, relative to each other, can vary in other embodiments.

Figure 10:
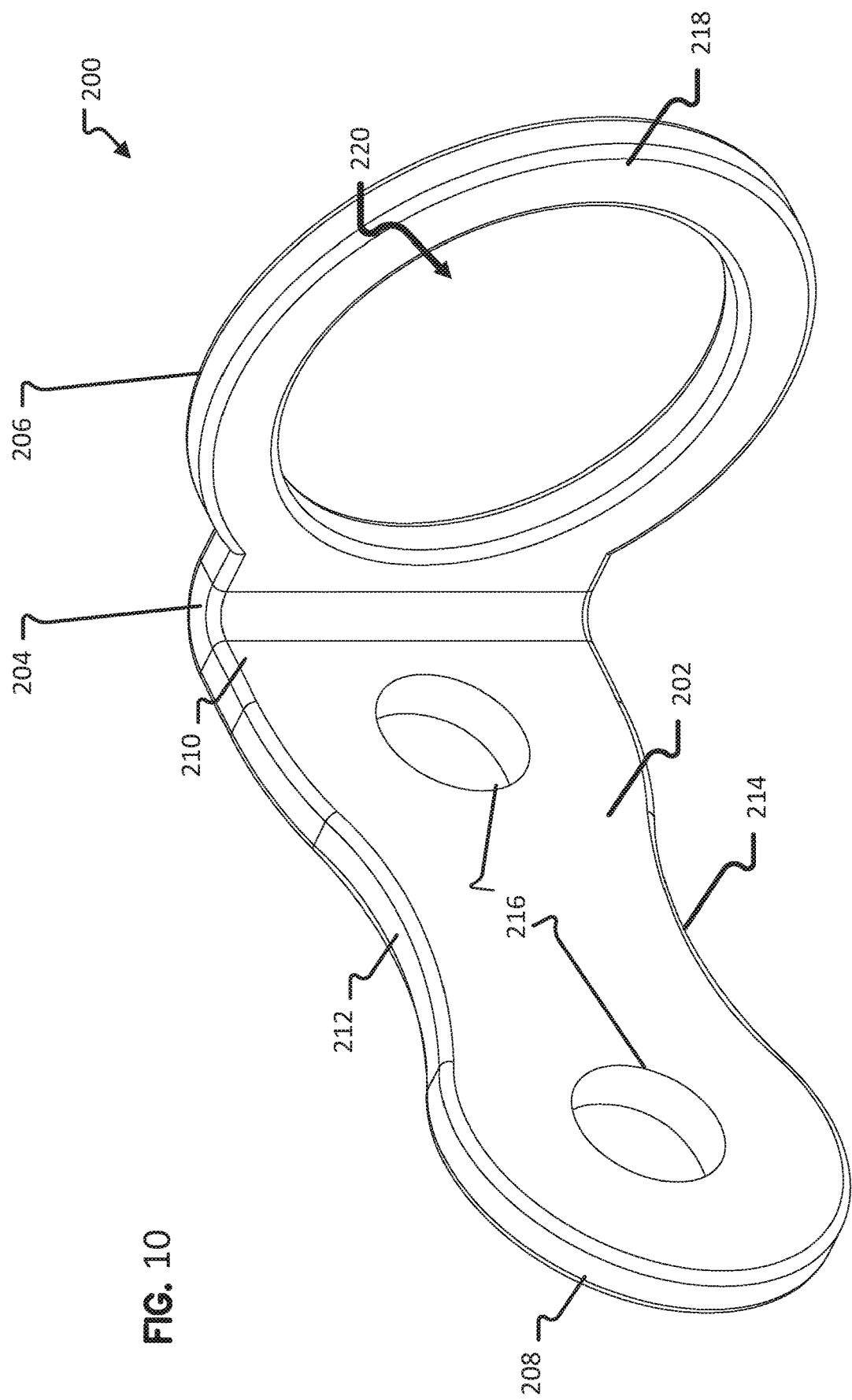
FIG. 10 is a schematic, front perspective view of an outer plate link.
Figure 11:
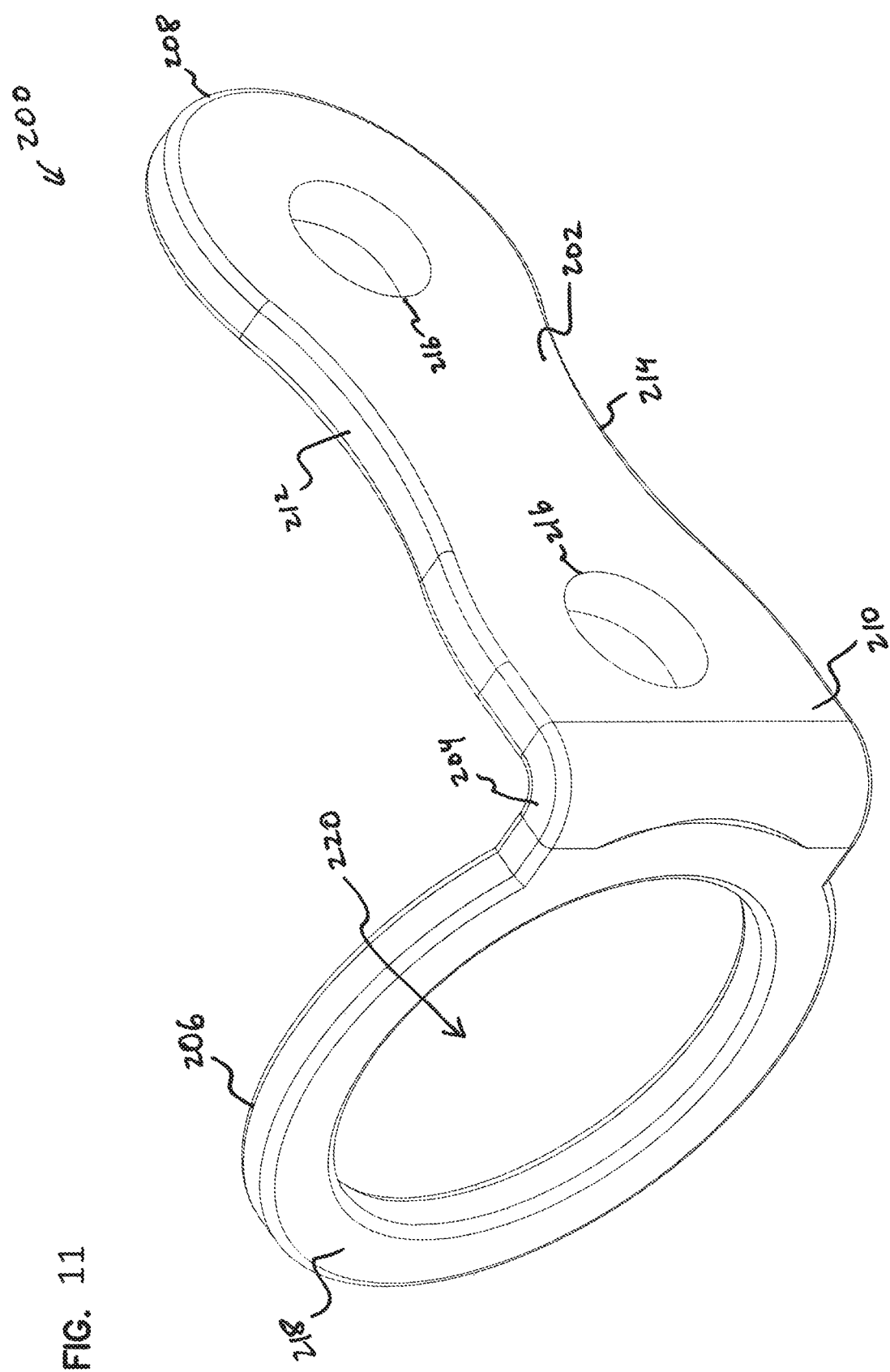
FIG. 11 is a schematic, rear perspective view of the outer plate link in FIG. 10.
Figure 12:
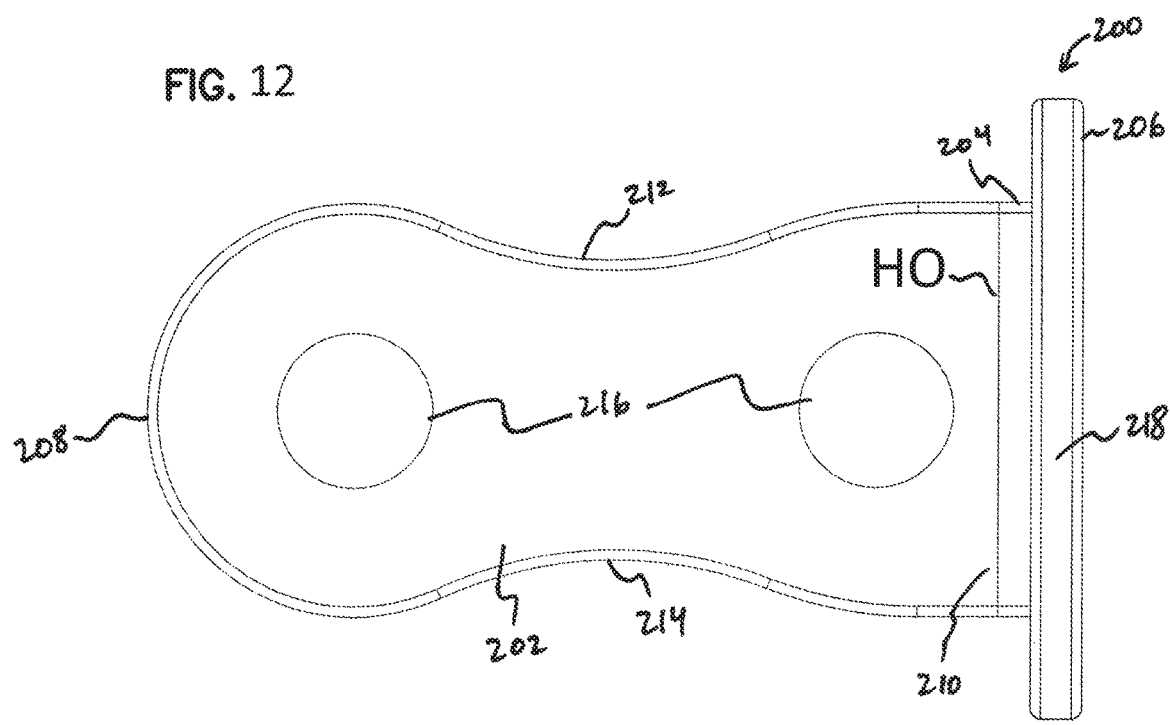
FIG. 12 is a schematic, front plan view of the outer plate link in FIG. 10.
Figure 13:
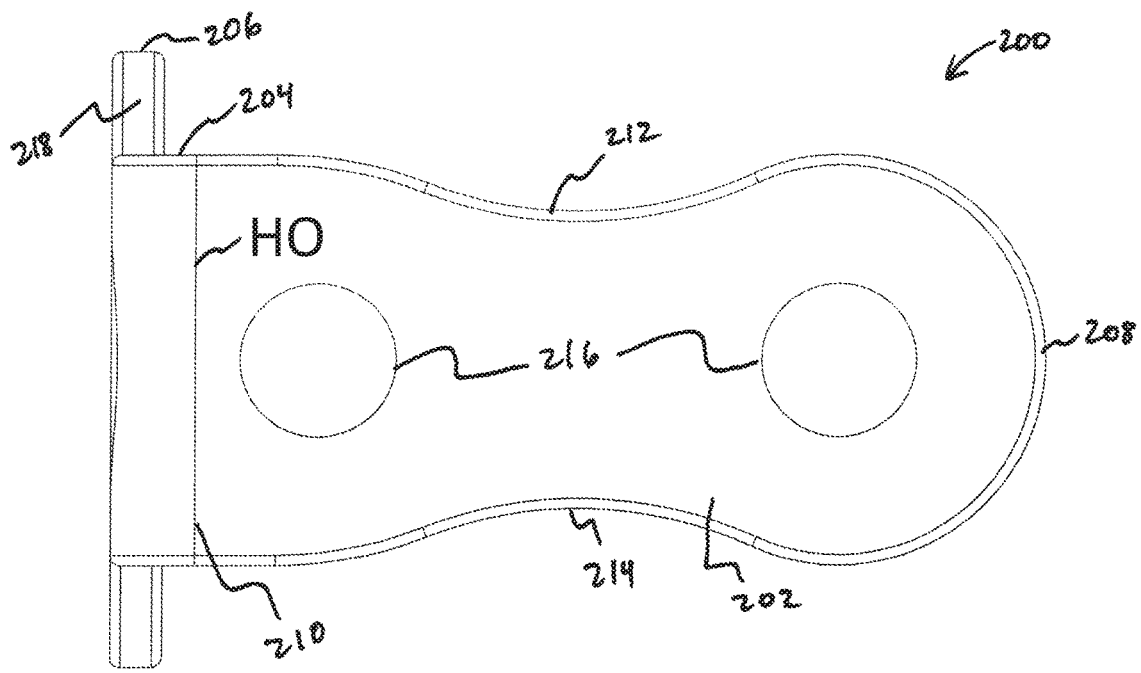
FIG. 13 is a schematic, rear plan view of the outer plate link in FIG. 10.
Figure 14:
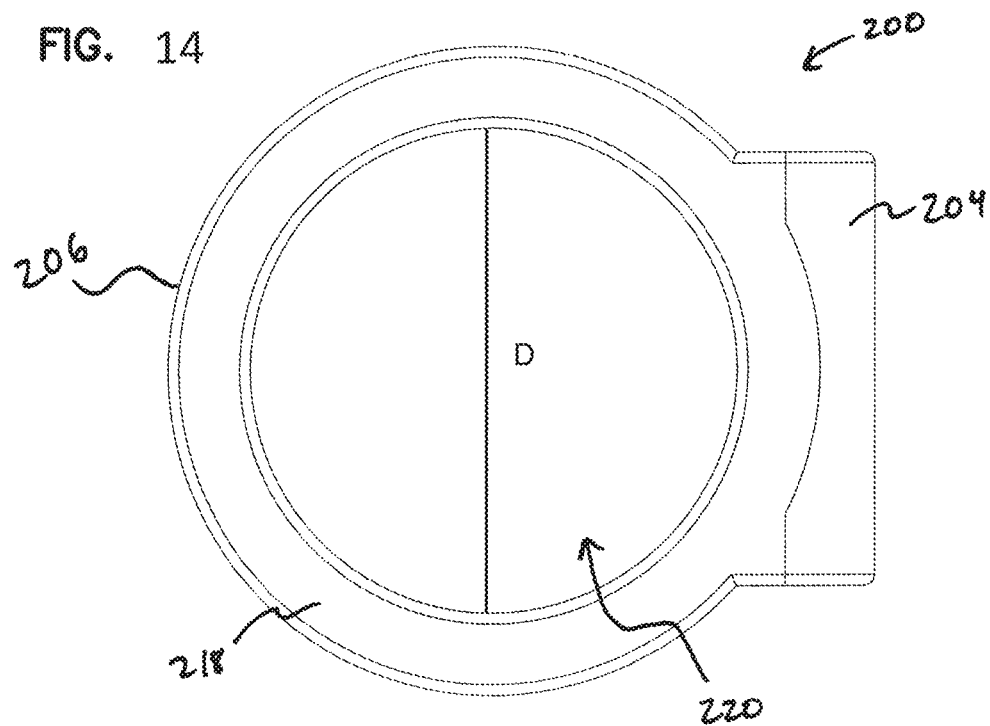
FIG. 14 is a schematic, first end view of the outer plate link in FIG. 10.
Figure 15:
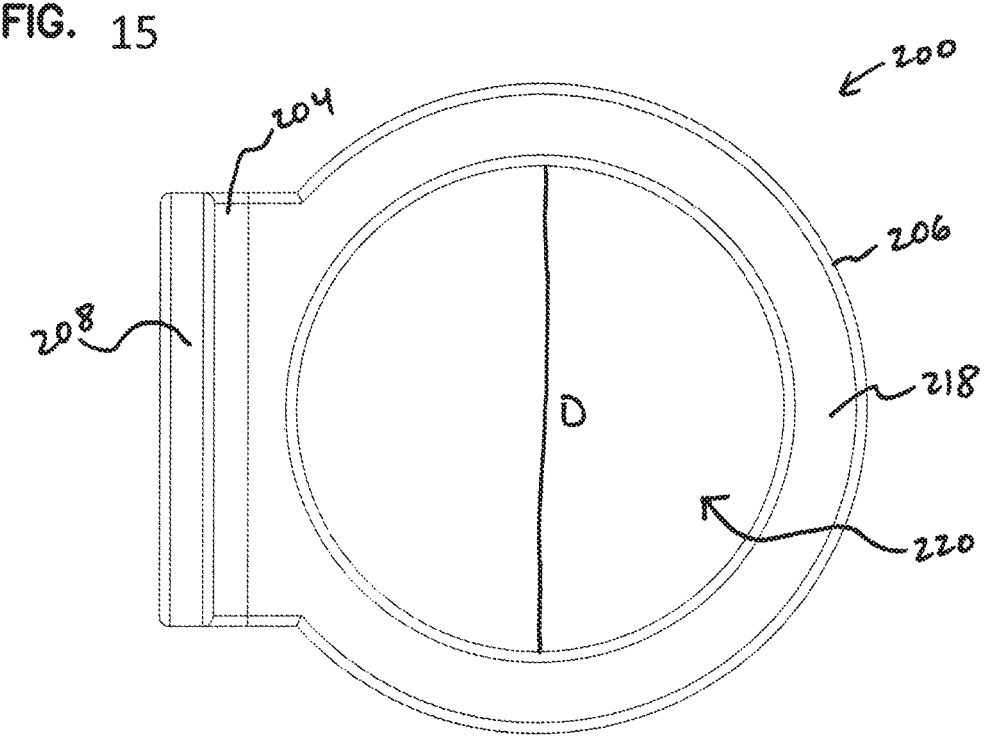
FIG. 15 is a schematic, second end view of the outer plate link in FIG. 10.
Figure 16:
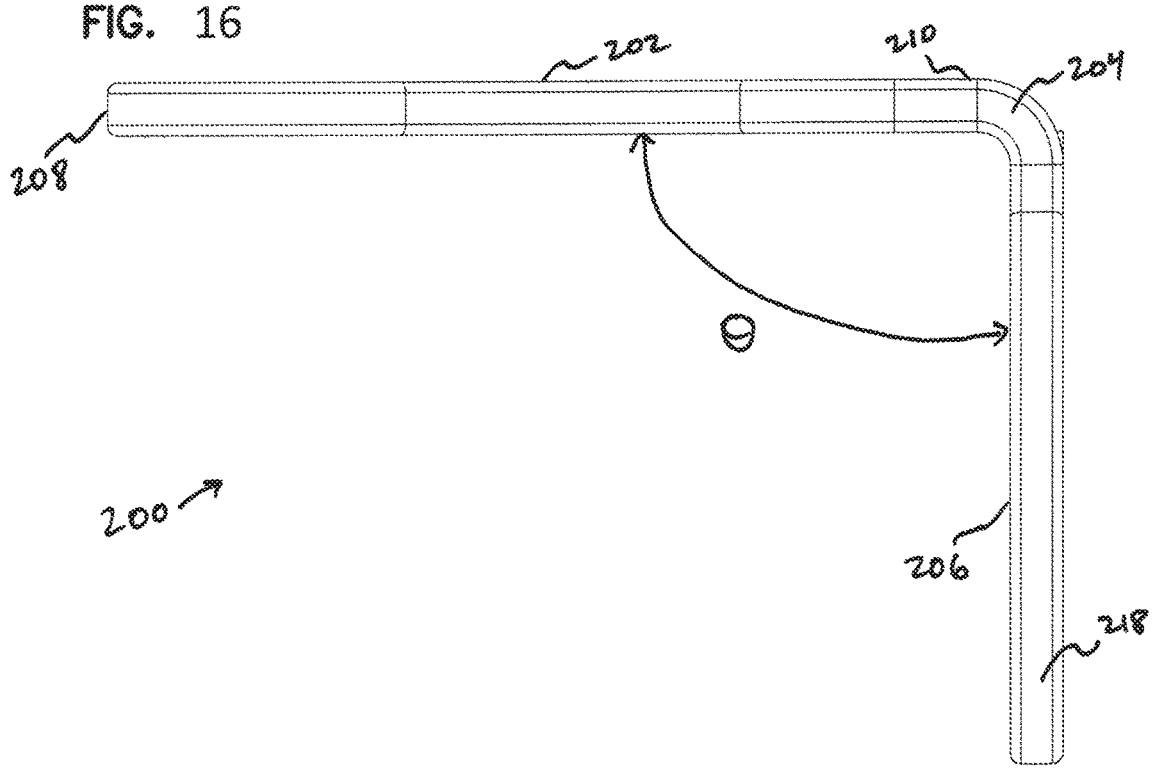
FIG. 16 is a schematic, top view of the outer plate link in FIG. 10.
Figure 17:
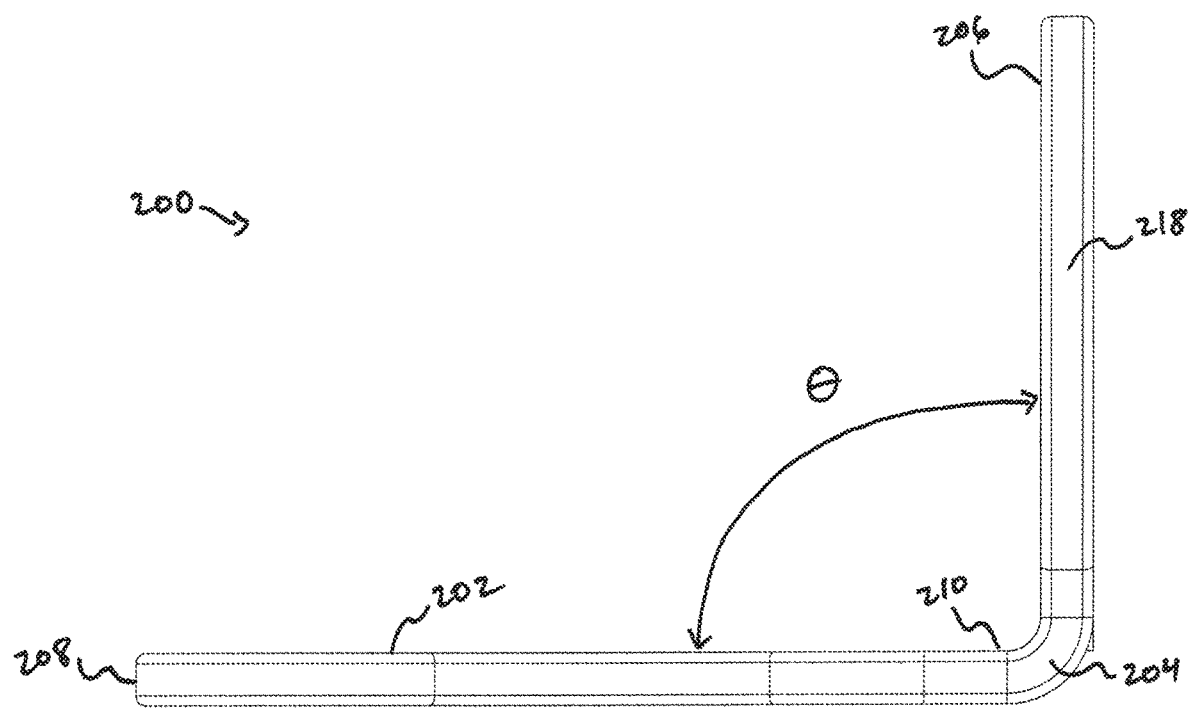
FIG. 17 is a schematic, bottom view of the outer plate link in FIG. 10.

FIGS. 10-17 illustrate an example embodiment of a roller chain outer plate link 200 shown as part of roller chain 150, 250 in FIGS. 1-9. FIG. 10 is a front perspective view of outer plate link 200; FIG. 11 is a rear perspective view of outer plate link 200; FIG. 12 is a front plan view of outer plate link 200; FIG. 13 is a rear plan view of outer plate link 200; FIG. 14 is a first end view of outer plate link 200; FIG. 15 is a second end view of outer plate link 200; FIG. 16 is a top view of outer plate link 200; FIG. 17 is a bottom view of outer plate link 200. FIGS. 10-17 are discussed concurrently below.

As noted above, outer plate link 200 forms part of roller chain 150, 250, and provides structure for supporting a cable passing between locations of an apparatus. Outer plate link 200 includes link portion 202, joint 204, and cable support portion 206.

Link portion 202 has opposite ends: first lead/tail end 208 and second lead/tail end 210. The shape of first end 208 is shown as rounded. However, the shape of first end 208 is largely a design choice chosen for its distinctive, ornamental and attractive appearance. Other shapes and configurations of first end 208, such as a polygonal profile, are contemplated. Second end 210 abuts joint 204 and has the same height as joint 204. Other sizes are contemplated.

First length edge 212 and second length edge 214 extend between first end 208 and second end 210. Although first and second length edges 212, 214 are shown as having curvature, other embodiments having less, or no, curvature are contemplated.

Link portion 202 also defines mounting aperture arrangement 216. Pins 156, 256 pass through mounting aperture arrangement 216, securing outer plate link 200 to roller chain 150, 250. As shown, mounting aperture arrangement 216 includes two apertures sized to receive pin 156, 256. Alternative configurations of mounting aperture arrangement 216 are possible, such as a continuous aperture defining rounded apertures on the end (roughly, a barbell shape).

Joint 204 connects link portion 202 and cable support 206. In the example shown, joint 204 is not a separate component but rather is a portion of outer plate link 200. Accordingly, joint 204 is integral to link portion 202 at second end 210. Joint 204 is also integral to cable support portion 206.

Outer plate link 200 bends as it transitions from link portion 202 to cable support portion 206 at joint 204, thereby defining internal bend angle $\theta$. Bend angle $\theta$ is indicated in FIGS. 7-8 and 16-17, Bend angle $\theta$ is defined as the interior angle between link portion 202 and cable support portion 206, distinguished from the outer bend angle that would be more than 180°.

Preferably, internal bend angle $\theta$ is 90°. In other instances, internal bend angle $\theta$ is slightly more or slightly less than 90°. As one example, internal bend angle $\theta$ is no less than 80° and no greater than 100°. As another example, internal bend angle $\theta$ is no less than 85° and no greater than 100°. As yet another example, internal bend angle $\theta$ is no less than 80° and no greater than 95°.

Cable support portion 206 is configured and sized to support cable passing therethrough and alongside roller chain 150, 250. Cable support portion 206 includes frame 218 that defines cable support aperture 220. As shown, cable support aperture 220 is circular. In alternate embodiments, cable support aperture 220 is non-circular, for example, polygonal.

Frame 218 is shown as circular. In other instances, frame 218 is non-circular. An example of a non-circular frame 218 is a square or squared-off frame. Additionally, the thickness of frame 218 can be varied from that shown in the figures.

Cable support aperture 220 has diameter D. As noted above, cable support aperture 220 is sized to receive a cable. Accordingly, in different implementations the size of cable support aperture 220 varies depending upon the size of the cable to be supported. As shown, diameter D is greater than the height of link portion 202. In other embodiments, diameter D is equal to the height of link portion 202. In still other embodiments, diameter D is less than the height of link portion 202.

Figure 18:
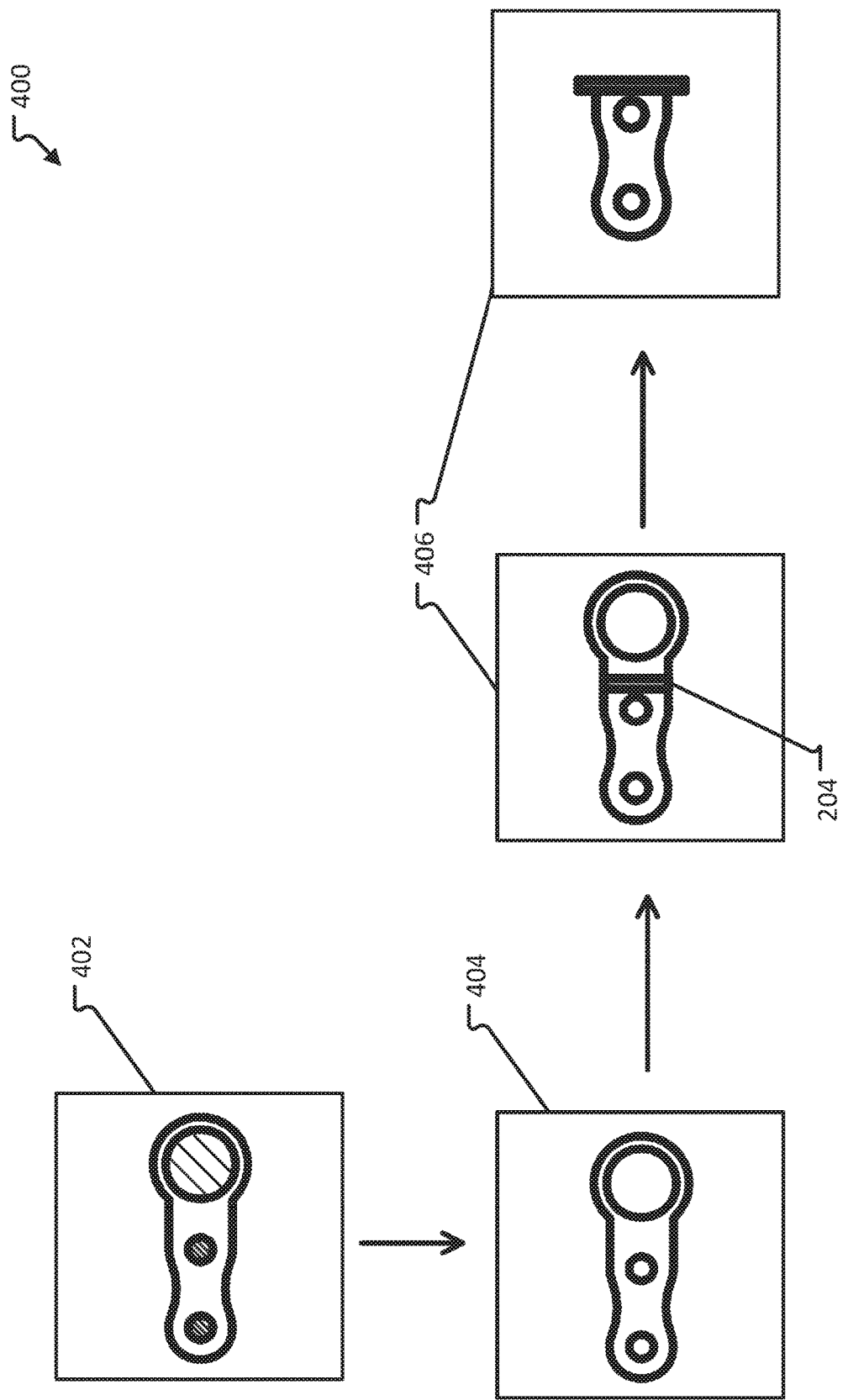
FIG. 18 is an example method of manufacturing an outer plate link.

FIG. 18 illustrates steps in example method 400 for manufacturing an outer plate link. Preferably, method 400 is performed as progressive die stamping, although other manufacturing methods are contemplated. Other embodiments can include more or fewer operations than those shown in FIG. 18.

The example method 400 begins by stamping out the outer plate link outline (operation 402). After stamping the outline (operation 402), holes for the mounting aperture arrangement and the cable support aperture are stamped out (operation 404). In some instances, operations 402 and 404 are performed simultaneously. The output of operations 402 and 404 is a flat outer plate link having apertures.

During operation 406, the outer plate link is folded up at joint 204. After operation 406, the outer plate link has a bend at joint 204 and the outer plate link is ejected from the stamping die.

Optionally, method 400 can include a chamfering operation to round off some or all of the edges of the outer plate link.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

The invention claimed is:

1. A roller chain having a first outer side and a second outer side, the roller chain comprising:
    a plurality of inner plate links disposed between the first outer side and the second outer side;
    a plurality of outer plate links disposed adjacent to some of the plurality of inner plate links; and
    a plurality of cable support outer plate links disposed adjacent to some of the plurality of inner plate links,
    wherein the first outer side includes a repeating arrangement of at least two outer plate links per each cable support outer plate link; and
    wherein each of the plurality of cable support outer plate links includes:
        a cable support link portion having opposite first and second lead/tail ends and an outer face, the cable support link portion defining a roller chain mounting aperture arrangement;
        a cable support portion oriented projecting from the outer face; and
        a joint positioned at one of the lead/tail ends of the cable support link portion;
            the cable support link portion, the joint, and the cable support portions each comprising portions integral with remaining portions of the cable support outer plate link,
    wherein the plurality of inner plate links have an inner plate link length extending between lead/tail ends of the inner plate link;
    wherein the plurality of outer plate links have an outer plate link length extending between lead/tail ends of the outer plate link; and
    wherein the inner plate link length is greater than the outer plate link length.

2. The roller chain according to claim 1, wherein the repeating arrangement of the first outer side is two outer plate links per each cable support outer plate link.

3. The roller chain according to claim 1, wherein the repeating arrangement of the first outer side is three outer plate links per each cable support outer plate link.

4. The roller chain according to claim 1, wherein the second outer side does not include any cable support outer plate links.

5. The roller chain according to claim 1, wherein each of the plurality of cable support outer plate links includes a waist portion between the lead/tail ends, the waist portion being narrower relative to the lead/tail ends.

6. The roller chain according to claim 5, the cable support link portion having a link height and the cable support portion having a cable support portion height greater than the link height.

7. The roller chain according to claim 1, wherein the cable support portion includes a cable support aperture defined by a cable support frame.

8. The roller chain according to claim 7, the cable support link portion including first and second length edges extending between the opposite first and second lead/tail ends;
    wherein the joint extends between the first and second length edges.

9. The roller chain according to claim 7, the cable support frame having a circular outer perimeter.

10. The roller chain according to claim 7, wherein the cable support aperture is continuous.

11. The roller chain according to claim 1, further comprising a plurality of rollers disposed between the plurality of inner plate links.

12. The roller chain according to claim 11, wherein the plurality of cable support outer plate links have a cable support outer plate link length extending between lead/tail ends of the cable support outer plate link; and
    wherein the inner plate link length is greater than the cable support outer plate link length.

13. The outer plate link according to claim 1, wherein the cable support link portion and the cable support portion define an internal bend angle, the internal bend angle being no less than 80 degrees and no greater than 100 degrees.

14. The outer plate link according to claim 13, the internal bend angle being no less than 85 degrees.

15. The outer plate link according to claim 13, the internal bend angle being no greater than 95 degrees.

16. A telescopic equipment system, comprising:
    a base stage;
    one or more extensible stages supported by the base stage;
    a roller chain disposed within the telescopic equipment system and having a first outer side and a second outer side; and
    a sprocket assembly, the roller chain being in operable engagement with the sprocket assembly,
    wherein the roller chain includes:
        a plurality of inner plate links disposed between the first outer side and the second outer side;
        a plurality of outer plate links disposed adjacent to some of the plurality of inner plate links; and
        a plurality of cable support outer plate links disposed adjacent to some of the plurality of inner plate links,
        wherein the first outer side includes a repeating arrangement of at least two outer plate links per each cable support outer plate link; and
        wherein each of the plurality of cable support outer plate links includes:
            a cable support link portion having opposite first and second lead/tail ends and an outer face, the cable support link portion defining a roller chain mounting aperture arrangement;
            a cable support portion oriented projecting from the outer face; and a joint positioned at one of the lead/tail ends of the cable support link portion;

the cable support link portion, the joint, and the cable support portions each comprising portions integral with remaining portions of the cable support outer plate link, wherein the plurality of inner plate links have an inner plate link length extending between lead/tail ends of the inner plate link, wherein the plurality of outer plate links have an outer plate link length extending between lead/tail ends of the outer plate link, and wherein the inner plate link length is greater than the outer plate link length.

17. The telescopic equipment system according to claim 16, wherein the repeating arrangement of the first outer side is two outer plate links per each cable support outer plate link; and wherein the second outer side does not include any cable support outer plate links.

18. The telescopic equipment system according to claim 17, wherein each of the plurality of cable support outer plate links includes a waist portion between the lead/tail ends, the waist portion being narrower relative to the lead/tail ends.

19. The telescopic equipment system according to claim 18, further comprising a plurality of rollers disposed between the plurality of inner plate links;

wherein the plurality of cable support outer plate links have a cable support outer plate link length extending between lead/tail ends of the cable support outer plate link; and wherein the inner plate link length is greater than the cable support outer plate link length.

* * * * *